US010026223B2

(12) United States Patent
Green

(10) Patent No.: US 10,026,223 B2
(45) Date of Patent: Jul. 17, 2018

(54) SYSTEMS AND METHODS FOR ISOSURFACE EXTRACTION USING TESSELLATION HARDWARE

(71) Applicant: Nvidia Corporation, Santa Clara, CA (US)

(72) Inventor: Simon Green, Reading (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/533,600

(22) Filed: Nov. 5, 2014

(65) Prior Publication Data

US 2016/0125648 A1 May 5, 2016

(51) Int. Cl.
*G06T 17/20* (2006.01)
*G06T 15/00* (2011.01)

(52) U.S. Cl.
CPC ............ *G06T 17/20* (2013.01); *G06T 15/005* (2013.01); *G06T 2210/21* (2013.01)

(58) Field of Classification Search
None
See application file for complete search history.

(56) References Cited

U.S. PATENT DOCUMENTS

2004/0012587 A1* 1/2004 Mech ...................... G06T 17/10 345/424

OTHER PUBLICATIONS

Tatarchuk et al., "Real-time isosurface extraction using the gpu programmable geometry pipeline." ACM SIGGRAPH 2007 courses. ACM, 2007.*

Kang et al., "Multi-resolution terrain rendering with GPU tessellation." The Visual Computer 31.4 (2015): 455-469. Published online: May 24, 2014.*

Fei et al., "Point-tessellated voxelization." Proceedings of Graphics Interface 2012. Canadian Information Processing Society, 2012.*

Gibson, Sarah F. Fisken, "Constrained Elastic SurfaceNets: Generating Smooth Models from Binary Segmented Data," Mitsubishi Electric Research Laboratories, http://www.merl.com, TR99-24, Dec. 1999, 13 pages.

Lorensen, William E., et al., "Marching Cubes: A High Resolution 3D Surface Construction Algorithm," Computer Graphics, vol. 21, No. 4, Jul. 1987, 7 pages.

Hart, John C., et al., "Sphere Tracing: A Geometric Method for the Antialiased Ray Tracing of Implicit Surfaces," Manuscript, Jul. 1994, 50 pages.

Ju, Tao, et al., "Dual Contouring of Hermite Data," 8 pages, ACM Transactions on Graphics (TOG) 21.3 (2002) : 339-346.

* cited by examiner

*Primary Examiner* — Yi Wang

(57) ABSTRACT

Systems and methods of extracting an isosurface wherein points on the isosurface have a constant value. The method includes dividing a volume into a grid of voxels The method includes identifying intersecting edges in the voxels, wherein the intersecting edges intersect the isosurface. The method includes generating patches for the intersecting edges and tessellating the patches and generating a grid of tessellated vertices. The method includes determining intersection points of the tessellated vertices with the isosurface and moving the intersected vertices to form a finer approximation of the isosurface.

10 Claims, 6 Drawing Sheets

SYSTEMS AND METHODS FOR ISOSURFACE EXTRACTION USING TESSELLATION HARDWARE

TECHNICAL FIELD

This application is directed, in general, to graphics processing systems and methods and, more specifically, to systems and methods for extracting an isosurface using tessellation hardware implemented in graphics processing systems.

BACKGROUND

An isosurface is a surface that represents points of a constant value (e.g., pressure, temperature, velocity or density) within a volume of space. Isosurface extraction is an important technique widely used in visualization. For example, isosurface extraction is used in computed tomography (CT), magnetic resonance (MR), video games and for rendering terrains and surfaces. The object of isosurface extraction is to generate a polygonal mesh representing an isosurface in a three-dimensional (3D) scalar field (i.e., a volume).

Conventional techniques for extracting an isosurface include raycasting and marching cubes or tetrahedra. Although conventional techniques allow reasonably accurate isosurfaces to be extracted from 3D scalar fields, they suffer from two shortcomings. First, they are relatively slow; and second, they take inadequate advantage of modern GPU architectures.

SUMMARY

Disclosed embodiments are directed to systems and methods for extracting an isosurface wherein points on the isosurface have a constant value. The method includes dividing a volume into a grid of voxels (cubes). The method includes identifying intersecting edges in the voxels, wherein the intersecting edges intersect the isosurface.

The method includes generating quadrilateral patches for the intersecting edges. The method includes tessellating the patches and generating a grid of tessellated vertices. The method includes determining intersection points of the tessellated vertices with the actual isosurface and moving the intersected vertices to form a finer approximation of the isosurface.

According to disclosed embodiments, a non-transitory computer-readable medium is encoded with computer-executable instructions for extracting an isosurface wherein points on the isosurface have a constant value. The computer-executable instructions when executed cause at least one data processing system to: divide a volume into a grid of voxels; identify intersecting edges in the voxels, wherein the intersecting edges intersect the isosurface; generate quadrilateral patches for the intersecting edges; tessellate the patches and generate a grid of tessellated vertices; determine intersection points of the tessellated vertices with the isosurface; and the intersected vertices to form a finer approximation of the isosurface.

BRIEF DESCRIPTION

Reference is now made to the following descriptions taken in conjunction with the accompanying drawings, in which.

DETAILED DESCRIPTION

Various disclosed embodiments are directed to systems and methods for isosurface extraction using tessellation hardware (tessellator). The systems and methods may be used to transform a coarser approximation of an isosurface into a finer approximation of the isosurface. This transformation process may then be repeated until the finer approximation is acceptable (e.g., falls within a desired tolerance for accuracy). In certain embodiments, iterative transformation is significantly faster than conventional isosurface extraction techniques and takes greater advantage of GPU hardware tessellation resources. Those skilled in the pertinent art will understand that the iterative process embodied in the various systems and method embodiments disclosed herein may be roughly analogized at a very high level to a mechanical heat-shrinking process whereby heat is applied to an outer wrap composed of heat-shrinkable plastic to cause it to approach and then bear against a rigid object that it encloses. Before describing the embodiments, examples of a computing system and an associated GPU pipeline within which the embodiments may be implemented will be described.

Figure 1:
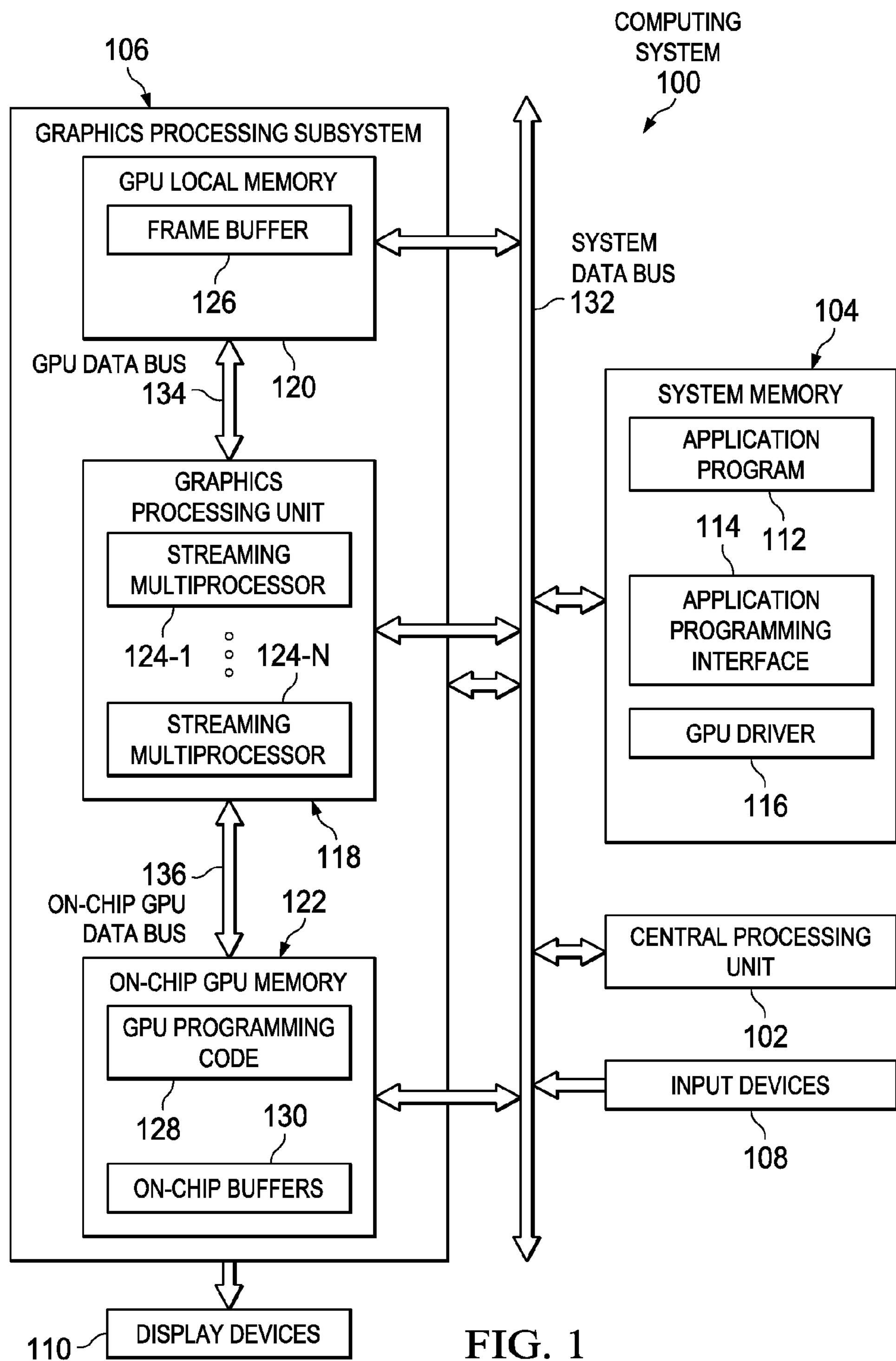
FIG. 1 is a block diagram of one embodiment of a computing system.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special-purpose processing unit or coprocessor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random-access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Figure 2:
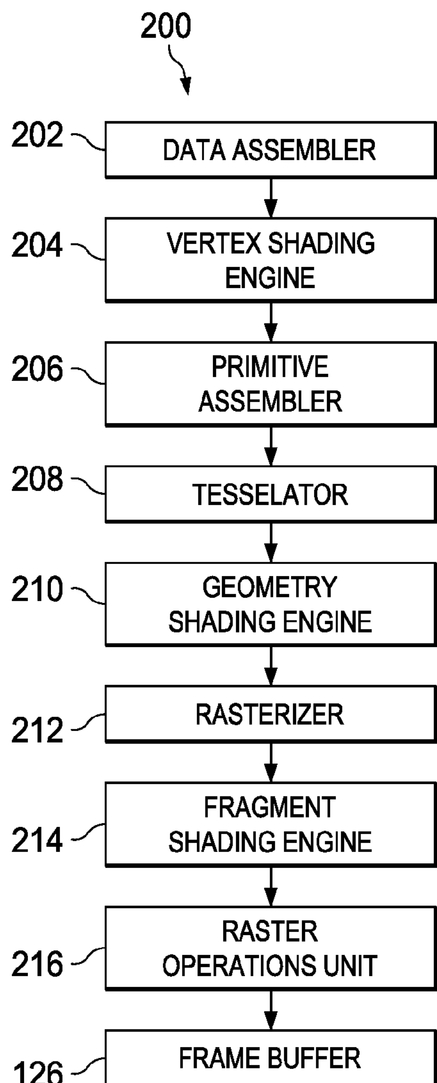
FIG. 2 is a block diagram of one embodiment of a programmable graphics pipeline.

FIG. 2 is a block diagram of one embodiment of a programmable graphics pipeline 200 residing within the computing system 100 of FIG. 1. The graphics pipeline 200 is configured to transform 3-D images into 2-D images. As shown, the graphics pipeline 200 includes a data assembler 202, a vertex shading engine 204, a primitive assembler 206, a tessellator 208, a geometry shading engine 210, a rasterizer 212, a fragment shading engine 214, a raster operations unit 216, and the frame buffer 126 of FIG. 1.

The data assembler 202 is a fixed-function unit that collects vertex data for high-order surfaces, primitives, and the like, and outputs the vertex data to the vertex shading engine 204. The data assembler 202 may gather data from buffers stored within system memory 104, the GPU local memory 120, and the on-chip GPU memory 122 as well as from API calls from the application program 112 used to specify vertex attributes. The vertex shading engine 204 is a programmable execution unit, such as the streaming multiprocessor 124-1 that is configured to execute a machine code vertex shading program, processing vertex data as specified by the vertex shading program. For example, vertex shading engine 204 may be programmed to transform the vertex data from an object-based coordinate representation (object space) to an alternatively based coordinate system, such as world space or normalized device coordinates (NDC) space. The vertex processing unit 204 may read and write data that is stored in GPU local memory 120 and the on-chip GPU memory 122.

The primitive assembler 206 is a fixed-function unit that receives processed vertex data from vertex shading engine 204 and constructs graphics primitives, e.g., points, lines, triangles, or the like, for processing by the geometry shading engine 210. In alternative embodiments, a second primitive assembler (not shown) may be included subsequent to the geometry shading engine 210 in the data flow through the GPU 118.

The tessellator 208 is a fixed-function unit that receives graphics primitives from vertex shading engine 204 and tesselates them to yield a greater number of simpler graphics primitives. According to disclosed embodiments, the tessellator 208 tesselates based on the spatial relationship between primitives representing a coarser approximation of an isosurface and data representing the isosurface itself. The product of the tessellator 208 is finer primitives that may then be analyzed and further processed to yield the isosurface.

The geometry shading engine 210 is a programmable execution unit, such as the streaming multiprocessor 124-1 that is configured to execute a machine code geometry shading program, processing tessellated graphics primitives received from the tessellator 208 as specified by the geometry shading program. The geometry shading engine 210 may be programmed to generate zero or more new graphics primitives and calculate parameters, such as plane equation coefficients, that are used to rasterize the new graphics primitives. For example, for use in cube-map rendering, the geometry shading engine 210 may be configured to process input primitives, sextuple the input primitives, and emit up to six sets of output primitives, one for each face of a cube. The geometry shading engine 210 may read and write data that is stored in the GPU local memory 120 and the on-chip GPU memory 122. The geometry shading engine 210 outputs the parameters and new graphics primitives to the rasterizer 212. The rasterizer 212 is a fixed-function unit that scans the new graphics primitives and outputs fragments and coverage data to the fragment shading engine 214.

The fragment shading engine 214 is a programmable execution unit, such as the streaming multiprocessor 124-1 that is configured to execute a machine code fragment shading program, processing fragments received from rasterizer 212 as specified by the machine code fragment shading program. For example, the fragment shading engine 214 may be programmed to perform operations such as perspective correction, texel mapping, shading, blending, and the like, to produce shaded fragments that are output to the raster operations unit 216. The fragment shading engine 214 may read and write data that is stored in the GPU local memory 120 and the on-chip GPU memory 122. The raster operations unit 216 optionally performs fixed-function computations, such as near and far plane clipping, and raster operations, such as stencil and z tests, and generates pixel data as processed graphics data for storage in a buffer in the GPU local memory 120, such as the frame buffer 126.

Certain embodiments of the graphics pipeline 200 include a tessellation engine (not shown) configured to convert low-detail surfaces into higher-detail primitives. In general, tessellation tiles high-order surfaces into structures that are more suitable for rendering.

Disclosed embodiments are directed to methods and systems for extracting an isosurface by using GPUs. In particular, disclosed embodiments provide faster extraction of an isosurface by using tessellation hardware (i.e. a “tessellator”) implemented in a GPU.

According to disclosed embodiments, an isosurface is extracted in two stages. In a first stage, a coarser surface of quadrilateral patches is generated, and the patches are tessellated by a tessellator. In a second stage, points at which vertices of the tessellated voxels intersect the isosurface are calculated in a domain shader and the vertices are moved to the isosurface.

According to disclosed embodiments, a volume is divided into a grid of voxels and a coarser approximation of an isosurface is formed. Quadrilateral patches are tessellated into polygonal meshes having edges and vertices. Intersection points of the vertices with the isosurface are determined. The vertices are then moved to the intersection points to form a finer approximation of the isosurface.

According to disclosed embodiments, the patches are tessellated using tessellation hardware which may be implemented in GPUs, such as, for example, DirectX 11 class GPU.

According to disclosed embodiments, the voxels are volume samples that represent a distance to the nearest surface (a signed distance field). The tessellation hardware analyzes the volume samples and generates polygonal meshes from the distance fields.

Figure 3:
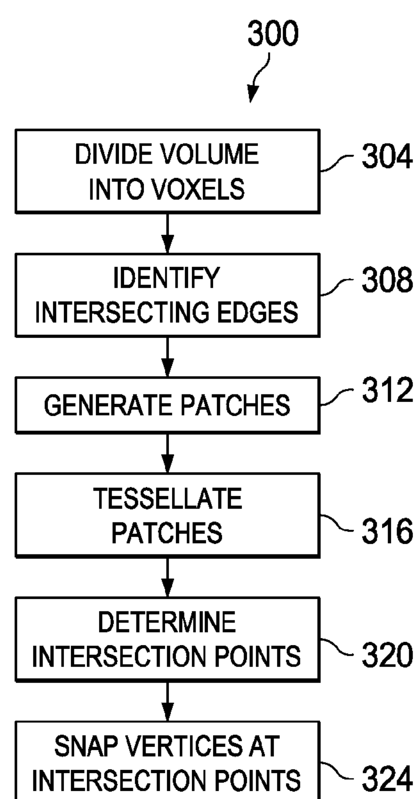
FIG. 3 is a flow diagram of a method of isosurface extraction.
Figure 4:
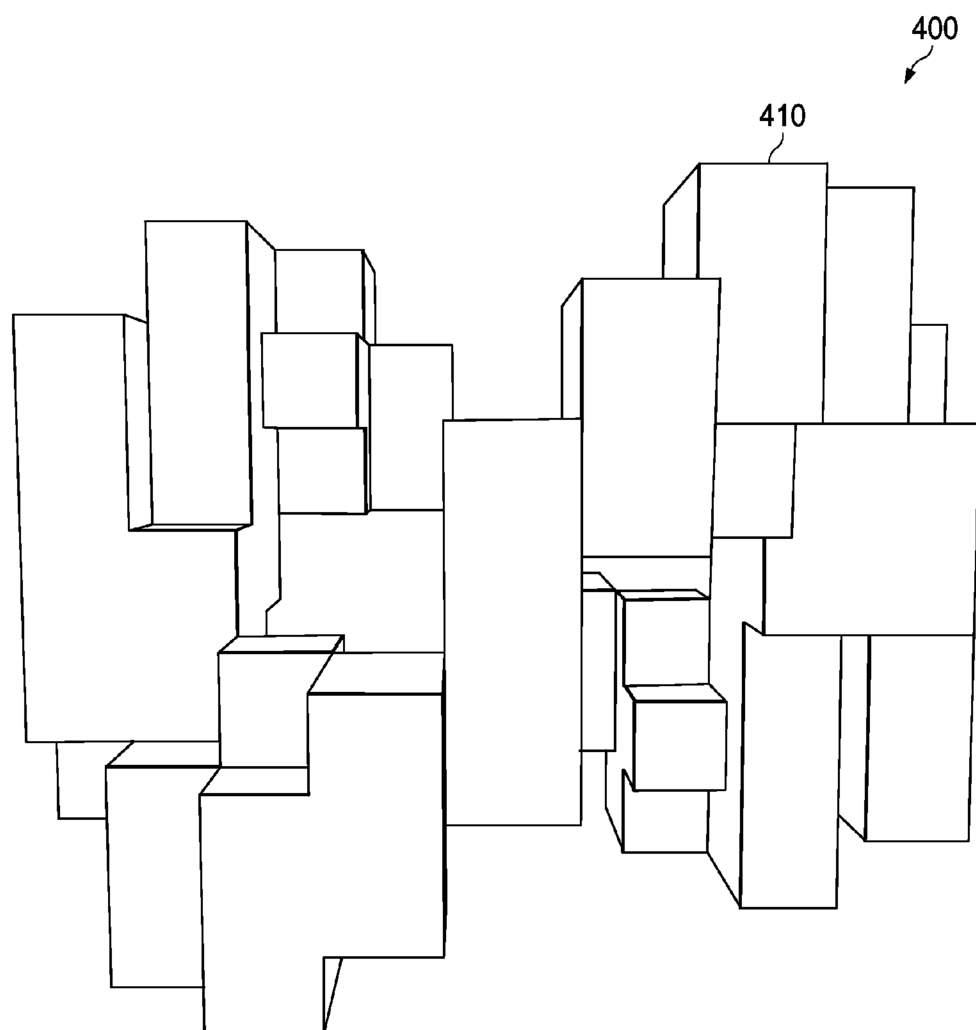
FIG. 4 illustrates a volume which is divided into voxels to form a coarser approximation of an isosurface.

FIG. 3 is a flow diagram of one embodiment of a method of isosurface extraction. In block 304, a volume is divided into a plurality of voxels. For each voxel, patches are generated which form a coarse approximation of the isosurface. FIG. 4 illustrates a volume 400 which is divided into patches 410 to form a coarse approximation of the isosurface. According to disclosed embodiments, the patches 410 may be generated by a tessellation control shader of a GPU.

In block 308, intersecting edges are identified. The intersecting edges are defined as edges that intersect the isosurface. For each voxel, the 12 edges of the cube are examined to determine if they intersect the isosurface. An edge is considered intersecting if one of its two vertices is inside the isosurface and one is outside. In block 312, patches for the intersecting edges are generated. According to disclosed embodiments, for each intersected edge, a quadrilateral patch is generated. The patches form the coarser approximation of the isosurface.

According to disclosed embodiments, the intersecting edges are identified by analyzing edges and vertices of the voxels. A vertex is inside the isosurface if the value of the volume at the vertex is less than the value of the isosurface. An edge intersects with the isosurface if the values of its two vertices indicate that one vertex is positioned inside the isosurface and the other vertex is positioned outside the isosurface. According to disclosed embodiments, up to 3 patches per cube may be generated to prevent overlapping faces.

Figure 5:
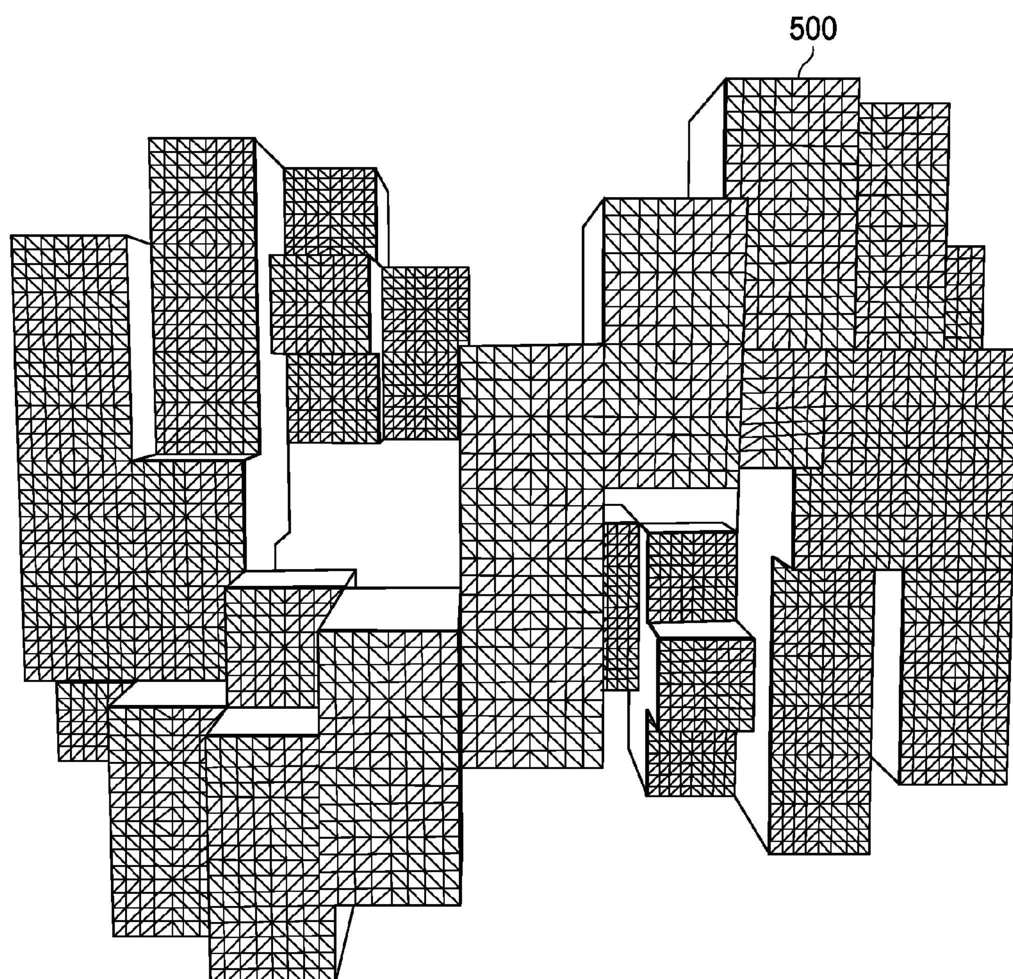
FIG. 5 illustrates patches which are tessellated into a grid of vertices.

In block 316, the patches are tessellated. For example, the patches may be tessellated into a grid of 64×64 vertices. The degree of tessellation may be adjusted. FIG. 5 illustrates patches 500 which are tessellated into a grid of 9×9 vertices.

In block 320, intersection points of the tessellated vertices are determined. According to disclosed embodiments, a domain shader may be used to search for the intersection points of the tessellated vertices with the isosurface. The tessellated vertices are moved to the surface at the intersection points to generate a finer approximation of the isosurface.

According to disclosed embodiments, if distance field data is available, the search may be performed by sphere tracing methods executed in a direction of the gradient of the distance field. For other types of data, ray marching or root finding methods may be used to determine the intersection points.

Figure 6:
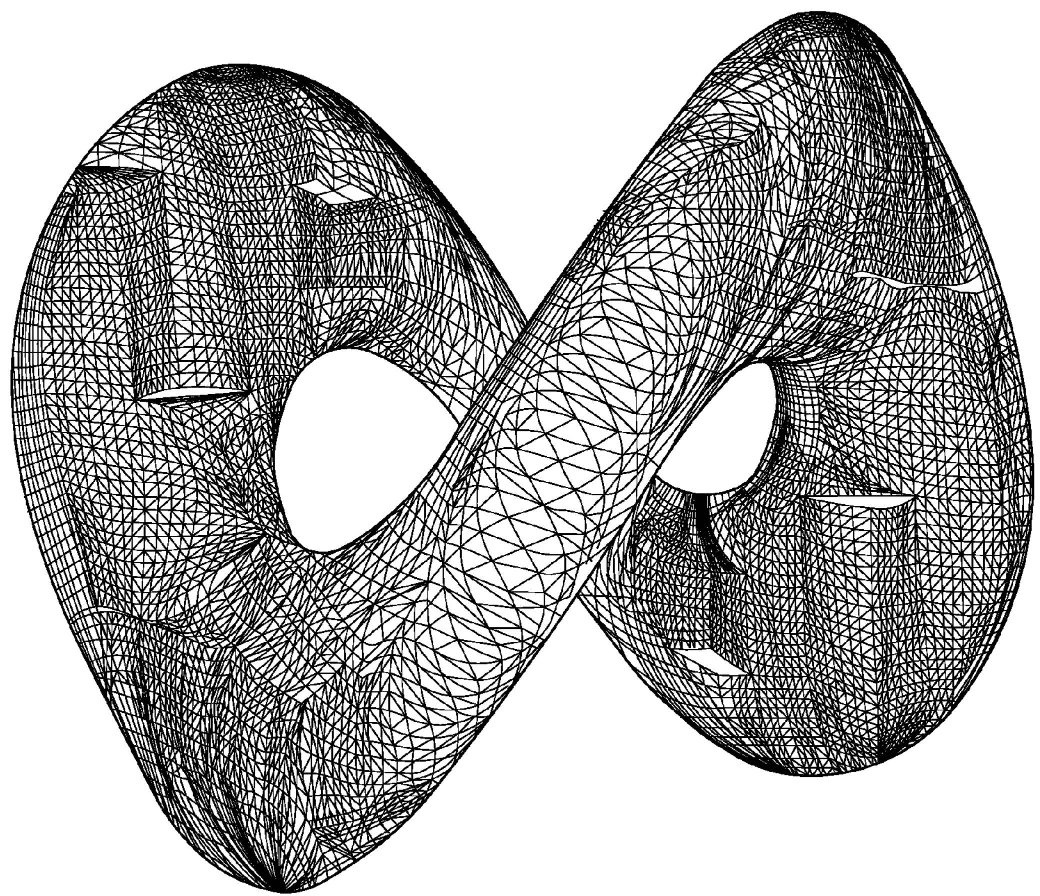
FIG. 6 illustrates intersection points of the tessellated patches and the vertices.

FIG. 6 illustrates intersection points of the tessellated patches and the isosurface, which are determined by a domain shader.

Figure 7:
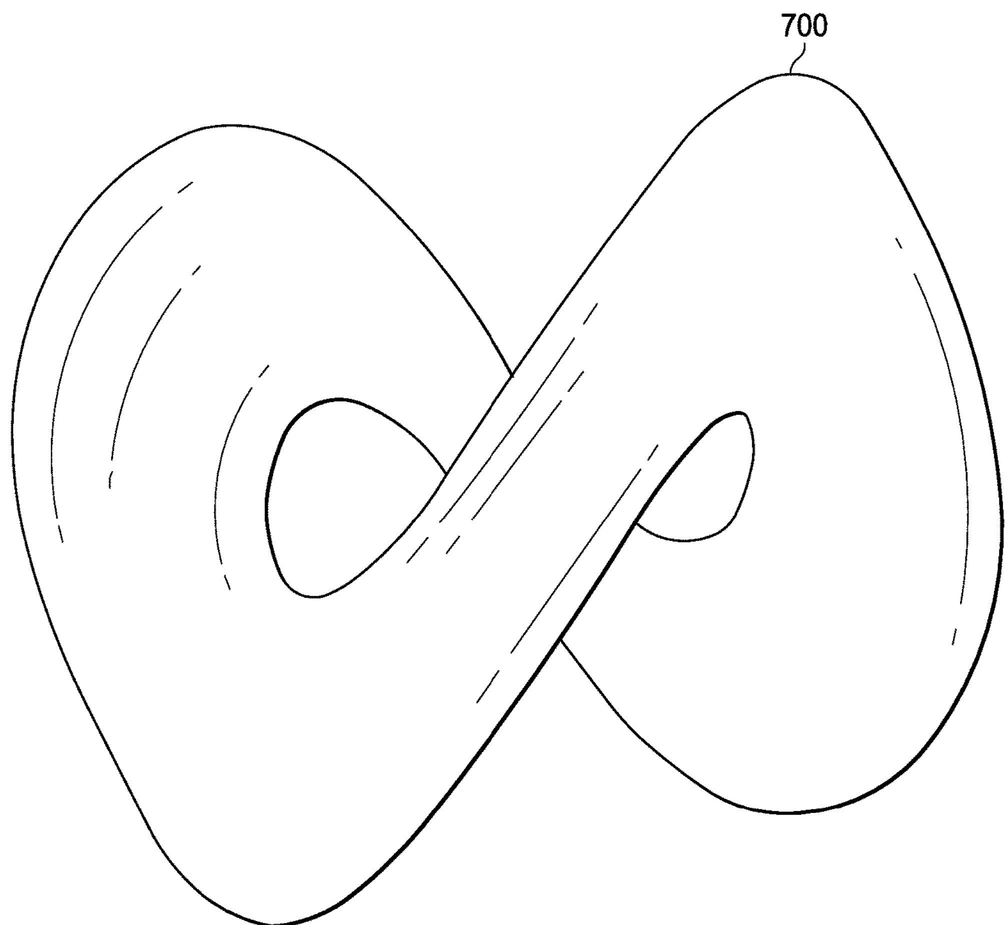
FIG. 7 illustrates an extracted isosurface.
Figure 8:
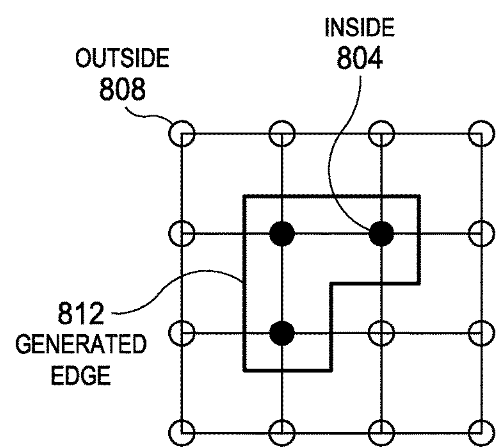
FIG. 8 is a two-dimensional illustration of the generation of quadrilateral patches.

FIG. 7 illustrates the resulting extracted isosurface with smooth shading 700. FIG. 8 is a two-dimensional illustration of the generation of quadrilateral patches. In FIG. 8, vertices inside an isosurface are identified and are indicated by solid circles. For example, the vertice 804 is inside the isosurface. Vertices which are outside the isosurface are identified and are indicated by hollow circles. For example, the vertice 808 is outside the isosurface. The generated edge 812 is indicated by a dark line.

Those skilled in the art to which this application relates will appreciate that other and further additions, deletions, substitutions and modifications may be made to the described embodiments.

What is claimed is:

1. A method of extracting an isosurface wherein points on the isosurface have a constant value, the method comprising:

dividing a volume into a grid of voxels;

identifying intersecting edges in the voxels, wherein the intersecting edges intersect the isosurface;

generating patches for the intersecting edges;

tessellating the patches, using a graphics processing unit, based on a spatial relationship between primitives representing the patches and data representing the isosurface and generating a grid of tessellated vertices;

determining intersection points of the tessellated vertices with the isosurface; and moving the tessellated vertices to the intersection points of the tessellated vertices with the isosurface to form a finer approximation of the isosurface.

2. The method of claim 1, wherein the edges intersect the isosurface if a vertex is positioned inside the isosurface and another vertex is positioned outside the isosurface.

3. The method of claim 1, wherein the patches are quadrilateral shaped.

4. The method of claim 1, wherein the intersection points of the tessellated vertices with the isosurface is determined by a domain shader.

5. The method of claim 1, wherein the patches are tessellated into a grid of up to 64×64 vertices.

6. A non-transitory computer-readable medium encoded with computer-executable instructions operable for extracting an isosurface wherein points on the isosurface have a constant value, wherein the computer-executable instructions when executed cause at least one data processing system to:

divide a volume into a grid of voxels;

identify intersecting edges in the voxels, wherein the intersecting edges intersect the isosurface;

generate patches for the intersecting edges;

tessellate the patches using a graphics processing unit, based on a spatial relationship between primitives representing the patches and data representing the isosurface and generate a grid of tessellated vertices;

determine intersection points of the tessellated vertices with the isosurface; and move the tessellated vertices to the intersection points of the tessellated vertices with the isosurface to form a finer approximation of the isosurface.

7. The non-transitory computer-readable medium of claim 6, wherein the voxel edges intersect the isosurface if a vertex is positioned inside the isosurface and another vertex is positioned outside the isosurface.

8. The non-transitory computer-readable medium of claim 6, wherein the patches are quadrilateral shaped.

9. The non-transitory computer-readable medium of claim 6, wherein the intersection points of the tessellated vertices with the isosurface is determined by a domain shader.

10. The non-transitory computer-readable medium of claim 6, wherein the patches are tessellated into a grid of up to 64×64 vertices.

* * * * *

UNITED STATES PATENT AND TRADEMARK OFFICE

CERTIFICATE OF CORRECTION

PATENT NO. : 10,026,223 B2
APPLICATION NO. : 14/533600
DATED : July 17, 2018
INVENTOR(S) : Simon Green It is certified that error appears in the above-identified patent and that said Letters Patent is hereby corrected as shown below:

In the Claims

In Claim 6, Column 8, Line 4, after --tessellate the-- delete "patches" and insert --patches,--

Signed and Sealed this
Twenty-fifth Day of September, 2018

Andrei Iancu
*Director of the United States Patent and Trademark Office*